United States Patent
Shaikh et al.

(10) Patent No.: US 8,782,253 B2
(45) Date of Patent: Jul. 15, 2014

(54) LOW LATENCY HANDOFF TO OR FROM A LONG TERM EVOLUTION NETWORK

(75) Inventors: Imtiyaz Shaikh, Irving, TX (US); John Macias, Antelope, CA (US); Derek Bao, Concord, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1079 days.

(21) Appl. No.: 12/791,676

(22) Filed: Jun. 1, 2010

(65) Prior Publication Data
US 2011/0296125 A1 Dec. 1, 2011

(51) Int. Cl.
*G06F 15/16* (2006.01)
(52) U.S. Cl.
USPC .......................................... 709/227; 370/329
(58) Field of Classification Search
USPC .......................................... 709/227; 370/329
See application file for complete search history.

(56) References Cited

U.S. PATENT DOCUMENTS

2009/0228661 A1* 9/2009 Borlick .......................... 711/133
2009/0305671 A1* 12/2009 Luft et al. ..................... 455/411
2011/0044264 A1* 2/2011 Chen et al. .................... 370/329

OTHER PUBLICATIONS

Handover—Wikipedia, the free encyclopedia , "Handover," http://en.wikipedia.org/wiki/Handoff, print date May 19, 2010, pp. 1-5.
Continuous Computing, "Interoperability in LTE," by V. Srinivasa Rao, Published in webbuyersguide.com, Mar. 12, 2010, pp. 1-12.
Spirent, "eHRPD," by Mike Keeley, CDG Technology Forum on Increasing Network Capacity and Reducing Transmission Costs through New Technological Innovations, Philadelphia, PA, Sep. 30, 2009, pp. 1-27.
3GPP TS 23.401 V9.4.0 (Mar. 2010), "$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 9)," pp. 1-258.
3GPP TS 23.402 V9.4.0 (Mar. 2010), "$3^{rd}$ Generation Partnership Project; Technical Specification Group Services and System Aspects; Architecture enhancements for non-3GPP accesses (Release 9)," pp. 1-198.

* cited by examiner

*Primary Examiner* — Glenford Madamba

(57) ABSTRACT

A server device in a long term evolution (LTE) network may store, in a memory, context information, associated with a prior communication session between the LTE network and a user device, where the context information permits a communication session to be established within a time period, the time period being less than another time period to initially establish the communication session or to establish the communication session without the context information. The server device may further receive a registration request associated with the user device; determine whether the memory stores the context information; perform, within the time period, an abbreviated registration operation to establish the communication session with the user device, using the context information from the memory, when the memory stores the content information; and perform, within the other time period, a registration operation to establish the communication session when the memory does not store the context information.

23 Claims, 7 Drawing Sheets

LOW LATENCY HANDOFF TO OR FROM A LONG TERM EVOLUTION NETWORK

BACKGROUND

System Architecture Evolution (SAE) is the core network architecture of the third generation partnership project (3GPP) long term evolution (LTE) wireless communication standard. During a communication session between a user device and an LTE network, the user device interfaces with an evolved packet core (EPC), which is one of the main components of the SAE. When a communication session is initiated, the EPC, associated with the LTE, receives information from and/or performs operations on the user device to establish and maintain connectivity with the user device. As a result of the operations, the EPC generates context information, associated with the user device, that is used to govern communications and/or provide a particular quality of service (QoS) associated with the communication session. The EPC may handoff the user device to another network when the user device leaves a cell associated with the LTE network and enters another cell associated with the other network. When the handoff to the other network is complete, the EPC will release the context information associated with the user device.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation, described herein, may include systems and/or methods that provide a low latency handoff to and/or from a long term evolution (LTE) network using context information associated with a user device. More particularly, the low latency handoff to and/or from an LTE network may use a latency reduction handoff application (hereinafter referred to as a "handoff application") that may perform operations to obtain and/or generate context information associated with user a device. As described herein, the handoff application may perform operations to register the user device when the user device attempts to communicate with an LTE network associated with the handoff application. For example, the user device may power up within a cell associated with the LTE network and/or may enter a cell associated with the LTE network. The handoff application may perform an operation to register the user device and may obtain and/or generate context information, associated with the user device, as a result of the registration operation.

As further described herein, the handoff application may use the context information to maintain communication with the user device and/or to perform a handoff operation (e.g., sometimes referred to as a handover operation). For example, the handoff application may use the context information to enable the user device to communicate with another network when the user device leaves a network associated with the handoff application. In another example, the handoff application may use the context information to permit the user device to be handed over from another network to the LTE network. In this example, the handoff application may retrieve the context information, obtained during a registration operation performed on the user device at a prior point in time, to permit the user device to communicate with the LTE network while avoiding the time and/or delay associated with performing another registration operation (e.g., hereinafter referred to as registration latency) on the user device.

Avoiding and/or reducing the registration latency associated with performing a handoff operation on a user device entering an LTE network (e.g., a cell associated with an LTE network) may reduce the time associated with the handoff operation, may reduce the probability of a service disruption regarding the user device, and/or may permit a particular quality of service to be provided to the user device traveling from one network to an LTE network.

Figure 1:
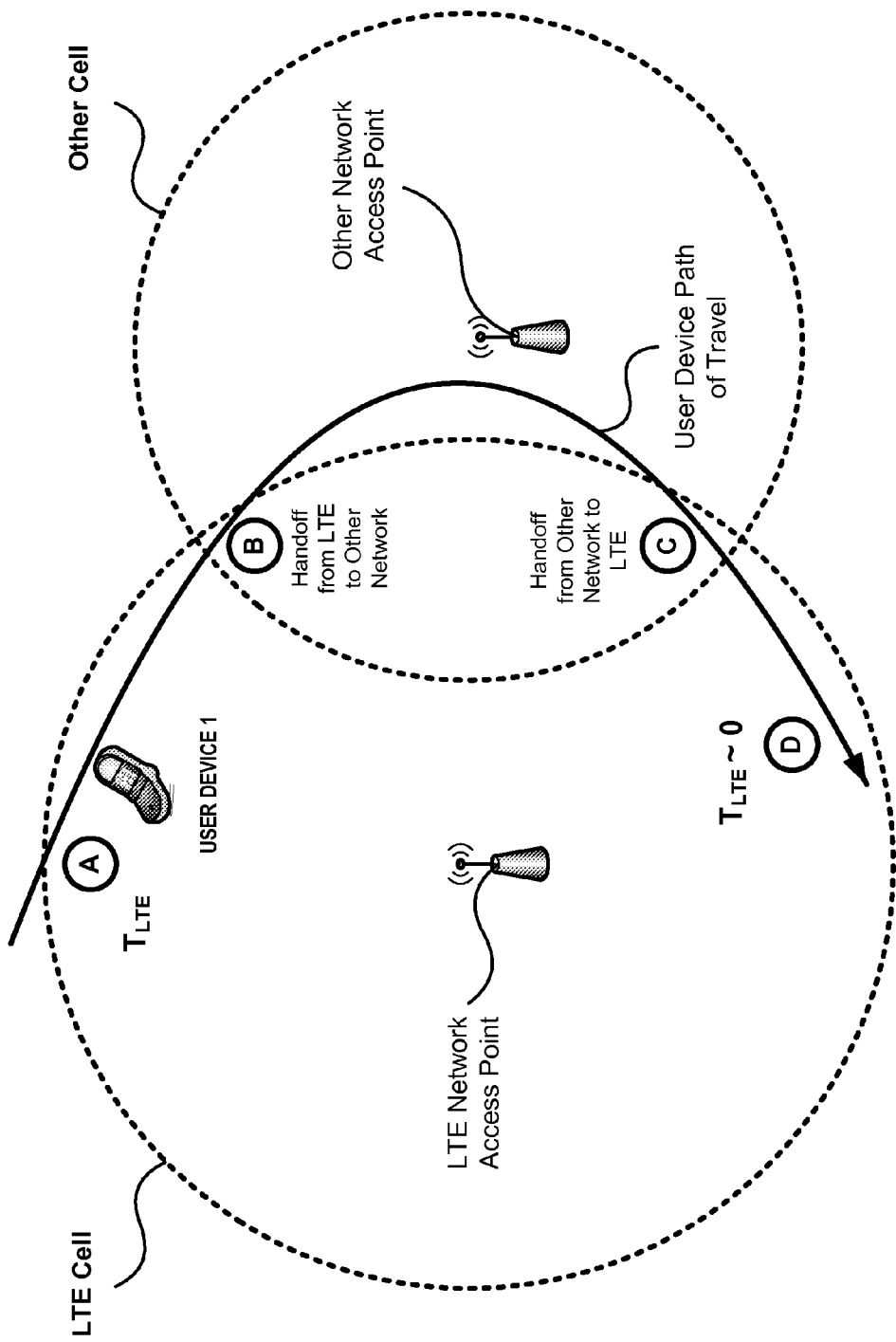
FIG. 1 is a diagram that illustrates an overview of a low latency handoff to or from a long term evolution network described herein.

FIG. 1 is a diagram that illustrates an overview of a low latency handoff to or from an LTE network described herein. As illustrated in FIG. 1, a user device (e.g., user device 1) may power up and/or may travel into a cell associated with an LTE network (e.g., shown as LTE cell).

An operation to register the user device for a communication session with the LTE network may be performed. For example, the user device may detect a signal transmitted by the LTE network and may send a request to access the LTE network. The LTE network may receive the request and a handoff application, associated with the LTE network, may use information obtained from the request to perform a registration operation on the user device in response to the request (e.g., shown as indication A). The registration operation may include authenticating the user device, generating context data associated with the user device, establishing communication paths (e.g., tunnels) to devices associated with the LTE network, sending policy information associated with the LTE network to the user device, and/or performing other operations on the user device. The registration operation may occur over a particular period of time (e.g., shown as $T_{LTE}$) from a point in time that the request from the user device was received until another point in time that the registration operation is completed (e.g., when the policy information is sent to the user device) (hereinafter referred to as registration latency of the LTE network). The handoff application may establish a communication session with the user device when the registration operation is complete.

An operation to handoff the user device to another network may be performed. For example, the user device may move through the LTE cell and may perform measurements to determine whether the power of the received signal, transmitted by the LTE network, degrades below a particular power threshold. The user device may transmit a measurement report to the LTE network indicating that the received power level, associated with the signal transmitted by the LTE network, has degraded below a particular threshold. The LTE network may receive the measurement report and the handoff application may send a handoff notification (e.g., shown as indication B) to the user device to initiate a handoff operation to another network. As the user device moves closer to and/or into a cell associated with the other network (e.g., shown as Other Cell), such as a 2G, 3G, other LTE network, etc., the user device may detect a signal being transmitted from the other network and/or may send a request to access the other network in a manner similar to that described above. Additionally, or alternatively, the handoff application may send a notification to release the user device from the LTE network and/or may store the context information, associated with the user device, in a memory for a particular period of time (e.g., a context retention time).

An operation to handoff the user device to an LTE network may be performed. Assume that the user device (e.g., user device 1) travels through the cell associated with the other network and returns to the cell associated with the LTE network. For example, the user device may travel through a portion of the other cell, may perform measurements on received signals transmitted from the other network and/or still other networks, and/or may move closer to and/or into the cell associated with the LTE network. In a manner similar to that described above, the other network may initiate an operation to handoff the user device to the LTE network (e.g., shown as indication C). The user device may detect a signal being transmitted from the LTE network and may send a request to access the LTE network in a manner similar to that described above. The LTE network may receive the request and the handoff application, associated with the LTE network, may determine whether context information, associated with the user device, is stored in a memory or has been erased (or is otherwise not available in the memory). If the user device returns to the LTE network while the memory stores the context information, then the handoff application may retrieve the context information associated with the user device and/or may re-establish the communication session without incurring the LTE latency (e.g., $T_{LTE}$~0) associated with the registration operation. If, however, the user device returns when the context information is no longer stored in the memory, then the handoff application may perform another registration operation on the user device to establish a new communication session with the user device.

Figure 2:
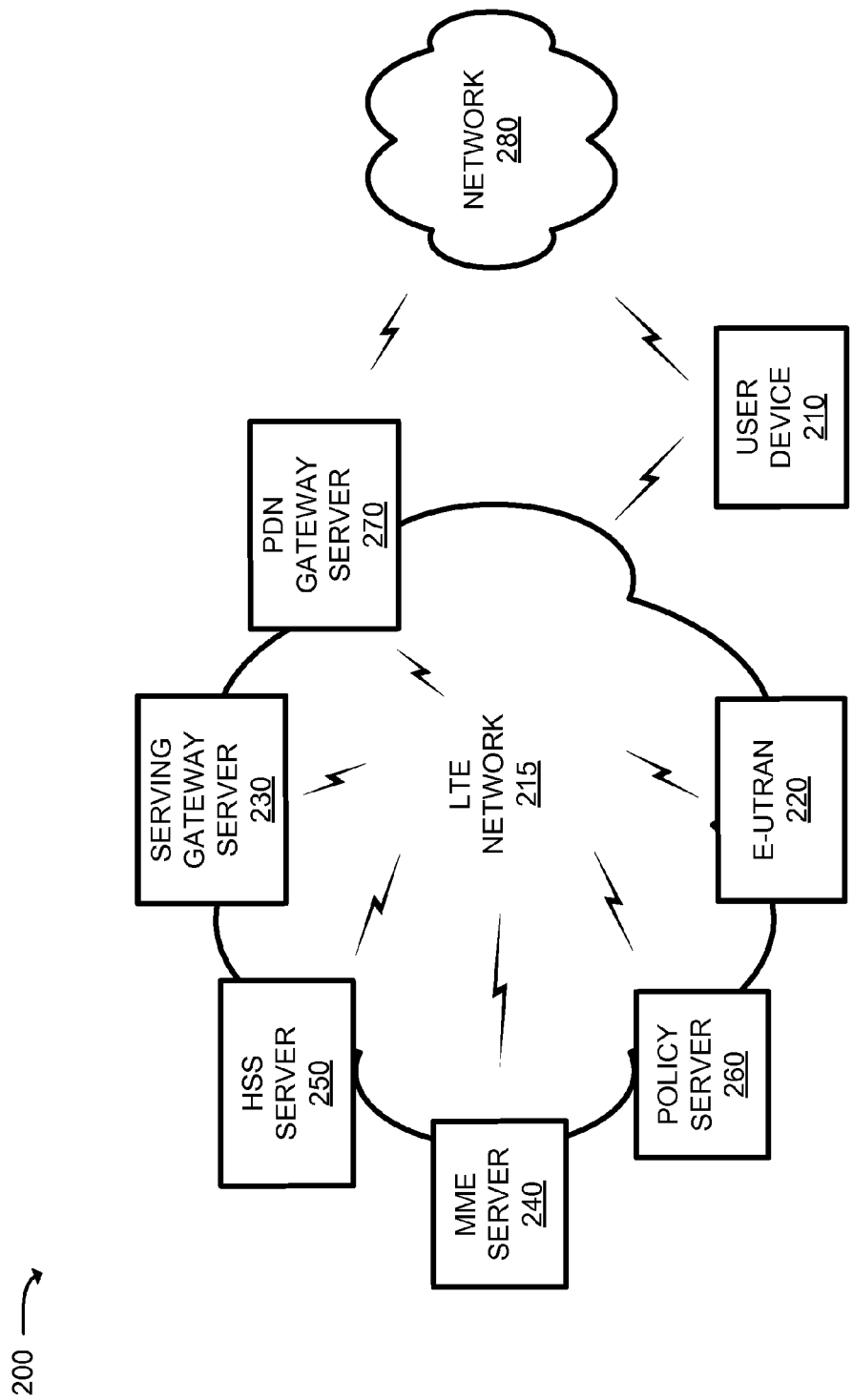
FIG. 2 is a diagram of an example network in which systems and/or methods described herein may be implemented.

FIG. 2 is a diagram of an example network 200 in which systems and/or methods described herein may be implemented. As shown in FIG. 2, network 200 may include user device 210, an LTE network 215, an Evolved-Universal Mobile Telecommunications System (UMTS) Terrestrial Radio Access Network 220 (hereinafter referred to as an "E-UTRAN 220"), serving gateway server 230 (hereinafter referred to as "SGW server 230"), mobility management entity server 240 (hereinafter referred to as an "MME server 240"), home subscriber service server 250 (hereinafter referred to as an "HSS server 250"), policy server 260, packet data network (PDN) gateway server 270 (hereinafter referred to as a "PGW server 270"), and/or network 280. The number of devices, illustrated in FIG. 2, is provided for explanatory purposes only. In practice, there may be additional devices, fewer devices, different devices, or differently arranged devices than illustrated in FIG. 2.

Also, in some implementations, one or more of the devices of network 200 may perform one or more functions described as being performed by another one or more of the devices of network 200. For example, MME server 240, HSS server 250, and/or policy server 260 may be integrated into a single device. In another example, SGW server 230 and/or PGW server 270 may be integrated into a single device. Devices of network 200 may interconnect via wired connections, wireless connections, or a combination of wired and wireless connections.

User device 210 may include any computation or communication device, such as a wireless mobile communication device that is capable of communicating via LTE network 215 and/or network 280. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a camera, a personal gaming system, or another type of mobile computation or communication device.

LTE network 215 may include a collection of network devices, such as E-UTRAN 220, SGW server 230, MME server 240, HSS server 250, policy server 260, PGW server 270, and/or other network devices. For example, LTE network 215 may operate in accordance with one or more releases of the LTE communication standard. Although LTE network 215 includes example network devices 220-270, in other implementations, LTE network 215 may include fewer network devices, additional network devices, different network devices, or differently arranged network devices than depicted in LTE network 215. Additionally, or alternatively, one or more network devices of LTE network 215 may perform one or more tasks described as being performed by one or more other network devices of LTE network 215.

E-UTRAN 220 may include a radio access network (RAN) provided via an eNodeB or a collection of eNodeBs. E-UTRAN 220 may carry a variety of traffic types, such as, for example, IP-based packet switched traffic. E-UTRAN 220 may permit connectivity between user device 210 (and/or a set of user devices 210) and network devices associated with LTE network 215. eNodeB (not shown) may include one or more devices that receive information, such as voice, video, text, and/or other data, from SGW server 230, MME server 240, and/or other network devices and/or that transmit the information to user device 210 via an air interface. eNodeB may also include one or more devices that receive information from user device 210 and/or that transmit the information to SGW 230, MME server 240, and/or other network devices via an air interface.

SGW server 230 may include one or more server devices, or other types of computation or communication devices, that gather, process, search, store, and/or provide information in a manner similar to that described herein. For example, SGW server 230 may receive information from user device 210 via the RAN (e.g., E-UTRAN 220, eNodeBs, etc.) and/or may send the received information to other network devices, via LTE network 215, such as MME server 240, HSS server 250, policy server 260, PGW server 270, and/or other network devices. SGW server 230 may also receive information from the other network devices and/or may send the received information to user device 210 via the RAN and/or to other network devices. For example, SGW server 230 may receive an instruction (e.g., as a result of a registration operation, handoff operation, and/or some other operation) from MME server 240 to establish a connection (e.g., a tunnel) for user 210 to communicate with other network devices associated with LTE network 215. In another example, SGW server 230 may receive information, associated with user device 210 and from PGW server 270, corresponding to an operation to handoff user device 210, from another network (e.g., network 280), to LTE network 215 and/or may send the received information to MME server 240 to be processed.

MME server 240 may include one or more server devices, or other types of computation or communication devices, that gather, process, search, store, and/or provide information in a manner similar to that described herein. For example, MME server 240 may perform operations associated with a low latency handoff to and/or from an LTE network. MME server 240 may host a handoff application that may perform operations to register user device 210 with LTE network 215, to handoff user device 210 from LTE network 215 to another network (e.g., network 280), to handoff a user device 210 from the other network to LTE network 215, and/or to perform other operations. MME server 240 may receive information associated with user device 210, may communicate with policy server 260, via SGW server 230, to obtain policy information to be used during a communication session associated with user device 210, and/or may store, as context information associated with user device 210, the received information associated with user device 210, the obtained policy information, and/or other information associated with the low latency handoff to an LTE network.

HSS server 250 may include one or more server devices, or other types of computation or communication devices, that gather, process, search, store, and/or provide information in a manner similar to that described herein. For example, HSS server 250 may manage, update, and/or store, in a memory associated with HSS server 250, service profile information associated with user device 210 that includes access point names (APNs) that are permitted for and/or accessible by user device 210, information associated with a user of user device 210 (e.g., a username, a password, a personal identification number (PIN), etc.), rate information, minutes allowed, and/or other information. APNs identify particular applications services, and/or data that are permitted for user device 210 in LTE network 215. Additionally, or alternatively, a particular APN may correspond to a packet data network (PDN) or a set of PDNs (e.g., the Internet, an intranet, etc.) that permit access to other applications, services, and/or data. Additionally, or alternatively, HSS server 250 may include a device that performs authentication, authorization, and/or accounting (AAA) operations associated with a communication session with user device 210. For example, HSS server 250 may use identifier information associated with user device 210, such as a public identifier (e.g., a mobile directory number (MDN), a mobile subscriber integrated services integrated network (MSISDN), etc.) and/or a private identifier (e.g., international mobile subscriber identity (IMSI), a mobile subscriber identity (MSID), etc.), a network address identifier (NAI), and/or other public identifiers, to perform authentication operations. In another example, HSS server 250 may use the identifier information associated with user device 210 to determine which services and/or applications are permitted for user device 210. In yet another example, HSS server 250 may manage account information, associated with user device 210, based on services and/or applications used and/or based on minutes used over a particular period of time.

Policy server 260 may include one or more server devices, or other types of computation or communication devices, that gather, process, search, store, and/or provide information in a manner similar to that described herein. For example, policy server 260 may provide real-time LTE network 215 policies associated with each APN/PDN, signal flow policies, security policies, quality of service thresholds, APN bandwidth (BW) allocations, billing rate information, etc. Policy server 260 may include a policy and charging rules function (PCRF) that may perform operations that enforce LTE network 215 policies associated with a communication session with user device 210. For example, the PCRF may dynamically provide real-time BW allocations and/or controls (e.g., allocated for a PDN or set of PDNs) associated with particular applications, network accesses, and/or services (e.g., associated with a particular APN) provided to user device 210 during a communication session. In another example, the PCRF may dynamically provide a particular real-time signal flow policy to adapt to changing conditions within LTE network 215 and/or to manage traffic flow during a communication session with user device 210.

PGW server 270 may include one or more server devices, or other types of computation or communication devices, that gather, process, search, store, and/or provide information in a manner similar to that described herein. For example, in one implementation, PGW server 270 may include a server device that enables and/or facilitates communications, using IP-based communication protocols, with other networks (e.g., network 280), such as an evolved high rate packet data (e.g. eHRPD) network, 2G network, 3G network, another LTE network, etc. In another example, PGW server 270 may receive an instruction from SGW server 230 and/or MME server 240 to send a handoff request to another network (e.g., an HRPD server gateway (HSGW) server in an eHRPD network) to permit user device 210 to be handed off from LTE network 215 to the other network. PGW server 270 may receive a request from the other network (e.g., from the HSGW server in the eHRPD network) to enable user device 210 to be handed over to LTE network 215.

Network 280 may include one or more mobile wireless networks. For example, network 280 may include a cellular network, the Public Land Mobile Network (PLMN), a mobile network (e.g., Global System for Mobile Communications (GSM), LTE, wideband code division multiple access (WCDMA), Ultra Mobile Broadband (UMB), Universal Mobile Telecommunications System (UMTS), Code Division Multiple Access 2000 (CDMA2000), ad hoc networks, High-Speed Packet Access (HSPA), etc.), and/or a non-cellular network (e.g., Wireless Fidelity (Wi-Fi), Worldwide Interoperability for Microwave Access (WiMax), etc.). Additionally, or alternatively, network 280 may include a wide area network (WAN), a metropolitan area network (MAN), an intranet, the Internet, and/or a combination of these or other types of networks.

Although not shown in FIG. 2, network 200 may include other devices, such as an authentication server and/or another network device. Each of these devices may perform certain functions described briefly below. Any of these functions may be performed by MME server 240 and/or HSS server 250. Thus, one or more of these devices may be integrated into MME server 240, HSS server 250 and/or another network device.

The authentication server may include one or more server devices, or other types of computation or communication devices, that authenticates user device 210. For example, the authentication server may receive a request to authenticate user device 210 based on information associated with user device 210 (e.g., an MDN, MSISDN, IMSI, etc.).

Figure 3:
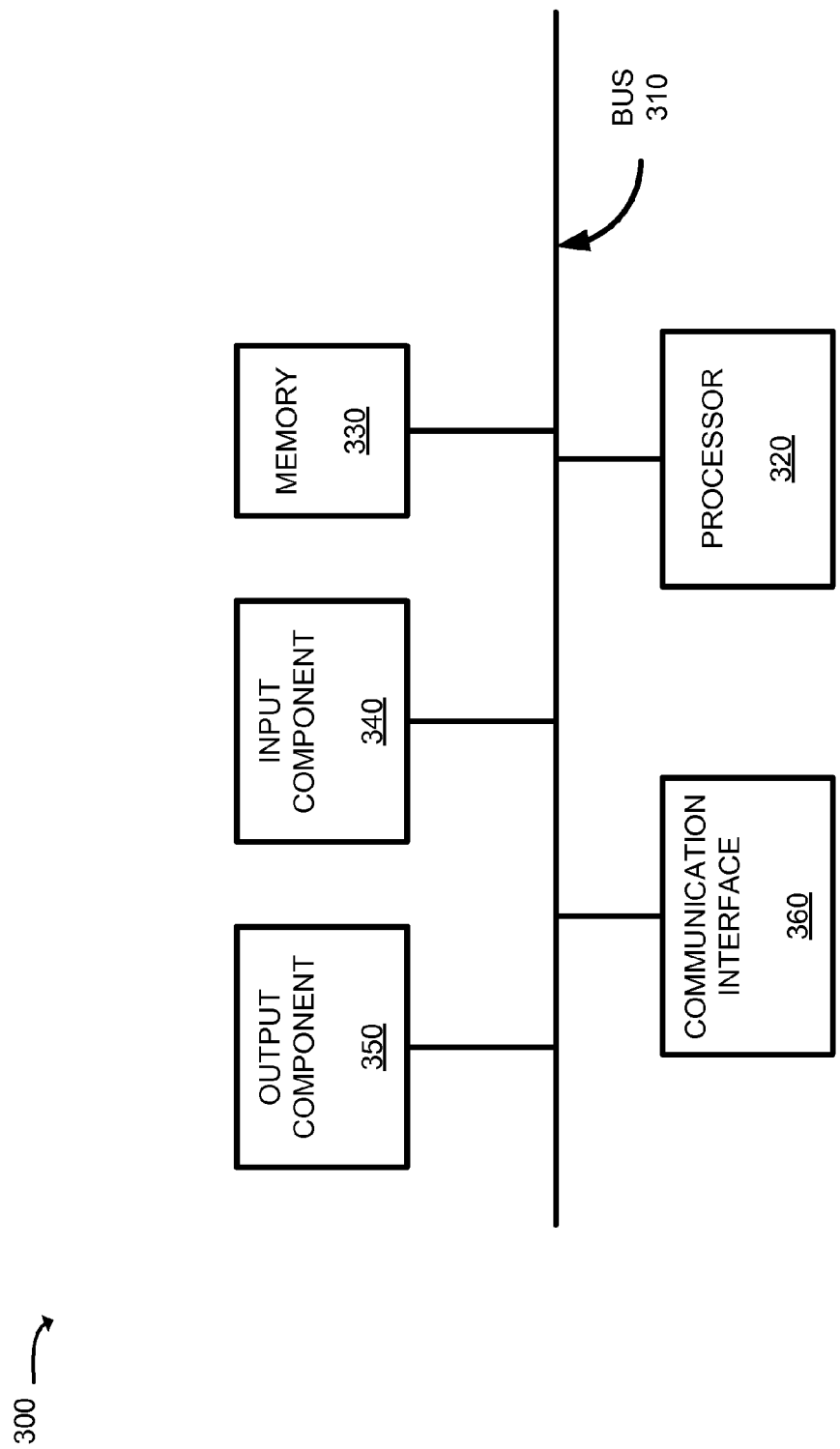
FIG. 3 is a diagram of example components of one or more of the devices of FIG. 2.

FIG. 3 is a diagram of example components of a device 300. Device 300 may correspond to SGW server 230, MME server 240, HSS server 250, policy server 260, and/or PGW server 270. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as LTE network 215 and/or network 280. In one alternative implementation, communication interface 360 may be a logical component that includes input and output ports, input and output systems, and/or other input and output components that facilitate the transmission of data to other devices.

As will be described in detail below, device 300 may perform certain operations relating to a low latency handoff to and/or from an LTE network. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
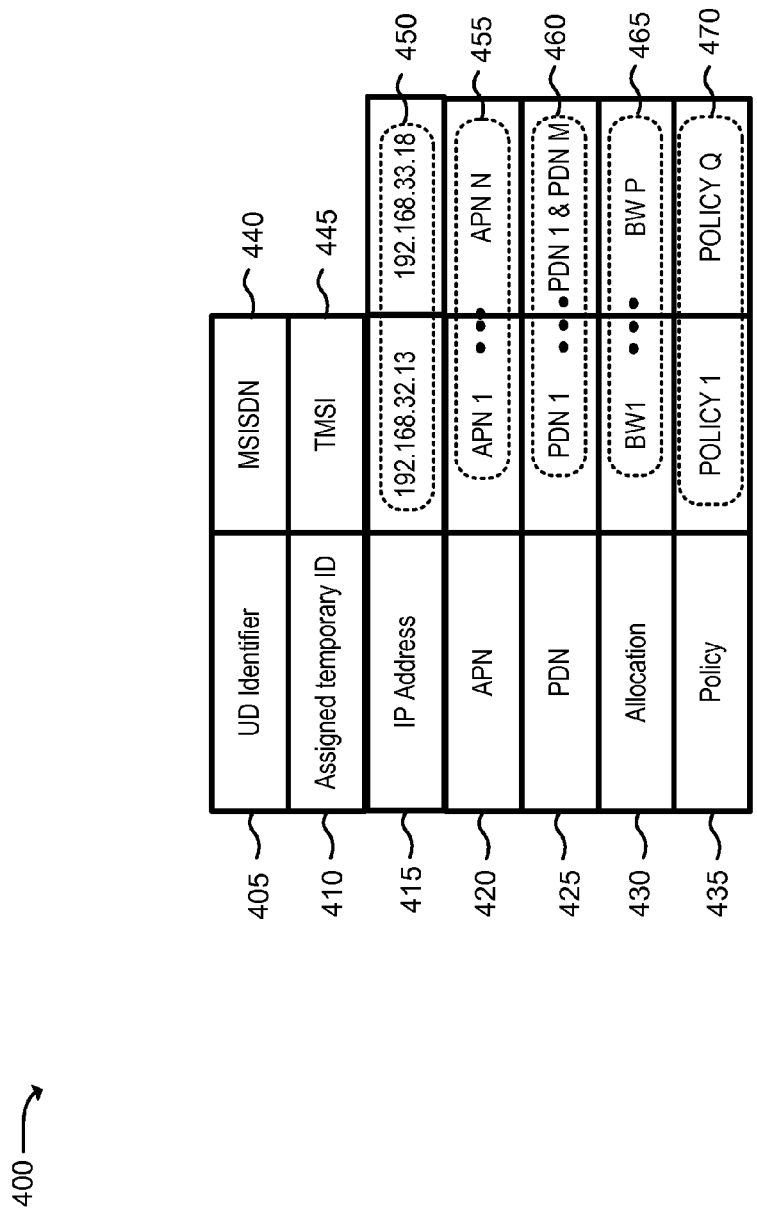
FIG. 4 is a diagram of an example user device context information memory that is capable of being generated within a portion of the network of FIG. 2.

FIG. 4 is a diagram of an example user device context information memory 400 that is capable of being generated within an example portion of the network 200 (FIG. 2). As illustrated, user device context information memory 400 (hereinafter referred to as "context memory 400") may include a user device identifier (e.g., UD identifier) entry 405, an assigned temporary identifier (e.g., assigned temporary ID) entry 410, an IP address entry 415, an access point name (e.g., APN) entry 420, a packet data network (e.g., PDN) entry 425, an allocation entry 430, and/or a policy entry 435. While FIG. 4 illustrates context memory 400, that includes certain entries, such as entries 405-435, in another implementation, a context memory 400 may include fewer entries, additional entries, different entries or differently arranged entries than are described with respect to FIG. 4.

UD identifier entry 405 may store identifier information associated with a particular user device 210 (e.g., MDN, MSISDN, NAI, IMSI, MSID, etc.) as a result of a registration operation performed on the particular user device 210 by the handoff application. Assigned temporary ID entry 410 may store temporary identifier information (e.g., a temporary mobile subscriber identity (TMSI)), that is generated for and/or assigned to the particular user device 210 by the handoff application, as a result of an authentication operation performed on the particular user device 210. IP address entry 415 may store an IP address or set of IP addresses associated with the particular user device 210 and which was assigned to the particular user device 210 as a result of a registration operation and/or received from another network as a result of a handoff operation. APN entry 420 may store information associated with an APN or set of APNs associated with each IP address stored in IP address entry 415 and/or based on subscriber information obtained from HSS server 250. PDN entry 425 may store a PDN, or set of PDNs, corresponding to each APN stored in APN entry 420.

Allocation entry 430 may store information associated with a bandwidth allocation for each PDN, or set of PDNs, stored in PDN entry 425. Additionally, or alternatively, allocation entry 430 may store aggregate bandwidth for each APN stored in APN entry 420. Policy entry 435 may store policy information, such as permitted applications and/or services, signal flow policies, security policies, quality of service thresholds, APN bandwidth allocations, and/or billing rate information, obtained from policy server 260 as a result of a registration and/or handoff operation performed on the particular user device 210 by the handoff application.

For example, the handoff application may perform a registration operation on a particular user device 210 in response to a request to permit the particular user device 210 to establish a communication session with LTE network 215. The handoff application may obtain, from the request, identifier information associated with the particular user device 210 (e.g., a MSISDN and/or some other identifier information) and may use the identifier information to authenticate the particular user device 210.

Identifier information and IP address information may be stored. For example, if the handoff application is able to authenticate the particular user device 210, then the handoff application may generate temporary identifier information (e.g., a TMSI and/or some other temporary identifier information), may assign the temporary identifier information to the particular user device 210, and/or may instruct SGW server 230 and/or PGW server 270 to assign an IP address for each APN (e.g., 192.168.32.13, 192.168.33.18, etc.), to the particular user device 210. The handoff application may store the identifier information, the temporary identifier information, and/or the IP address for each APN in a context memory (e.g., shown as entries 440 and 445, and/or ellipse 450, respectively, associated with context memory 400 of FIG. 4).

Subscriber information and policy information may be stored in a context memory. For example, the handoff application may retrieve subscriber information associated with the particular user device 210, from HSS server 250, that may include particular applications, services, data, and/or networks used and/or accessed by the particular user device 210. More particularly, the subscriber information may specify a particular APN, or set of APNs (e.g., APN 1, . . . , APN N), and/or a PDN and/or set of PDNs (PDN 1, . . . , PDN M) corresponding to each APN specified in the subscriber information. For example, as illustrated in FIG. 4, the handoff application may store the retrieved APN or set of APNs (e.g., APN 1, . . . APN N) in a context memory (e.g., shown by ellipse 455). Additionally, or alternatively, as shown by ellipse 460 (FIG. 4), the handoff application may store a PDN (e.g., PDN 1) that corresponds to a first APN entry (e.g., APN 1 of ellipse 455) and/or a set of PDNs (e.g., PDN 1 and PDN M) for another APN entry (e.g. APN N of ellipse 455).

Policy information may be stored in context memory 400. For example, the handoff application may retrieve policy information associated with the particular communication session, from policy server 260, that may include information associated with signal flow policy (e.g., uplink/downlink); access bearers assigned to implement communication channels (e.g., tunnels) to perform the signal flow policy (e.g., particular eNodeBs corresponding to E-UTRAN 220, SGW server 230, PGW server 270, etc.); security policy; quality of service (QoS) thresholds; bandwidth allocations for each APN stored in context memory (e.g., shown by ellipse 455 of FIG. 4); and/or other policy information. As illustrated in FIG. 4, for example, the handoff application may store a particular bandwidth allocation (e.g., BW 1) corresponding to APN 1 and/or some other bandwidth allocation (e.g., BW P) corresponding to APN N (e.g., as shown by ellipse 465). Additionally, or alternatively, the handoff application may store signal flow policies, access bearers, security policies, QoS thresholds and/or other policy information (e.g., policy 1, . . . , policy Q) corresponding to each APN stored in the context memory (e.g. shown as ellipse 470).

Figure 5A:
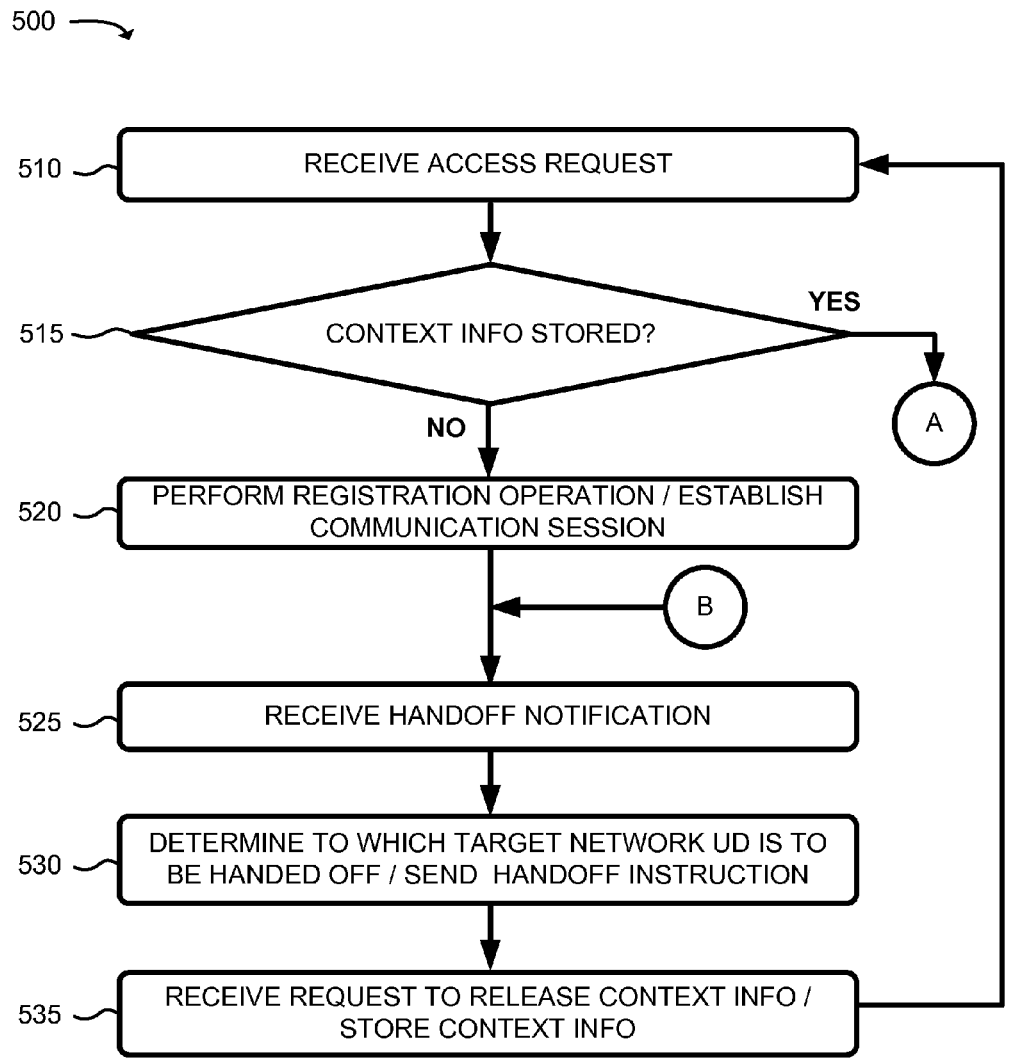
FIGS. 5A and 5B are flowcharts of an example process for handing off a user device associated with a long term evolution network within a portion of the network of FIG. 2.
Figure 5B:
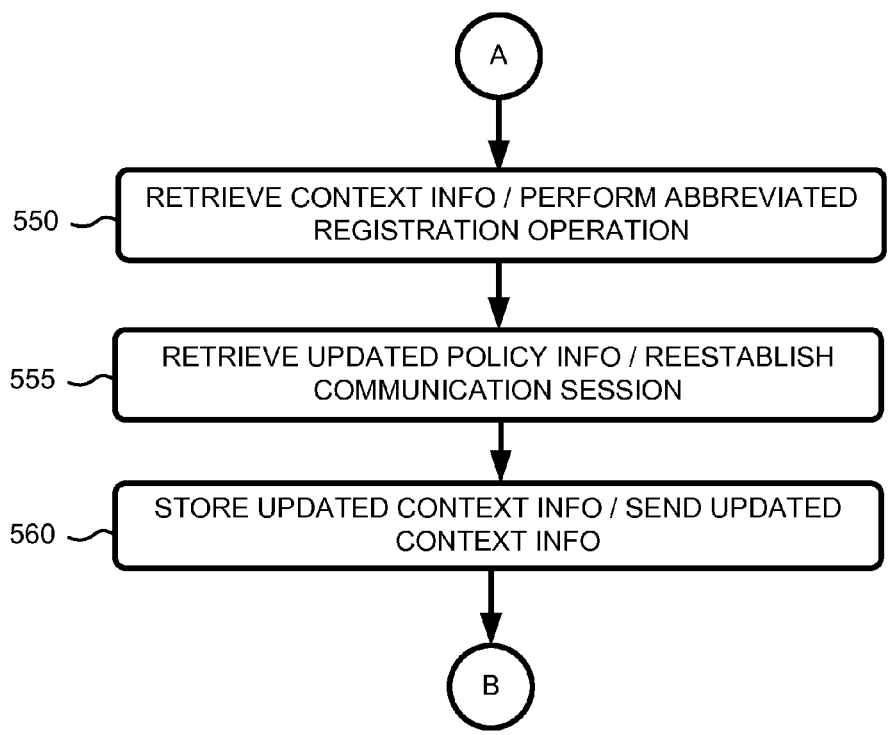
Figure 6:
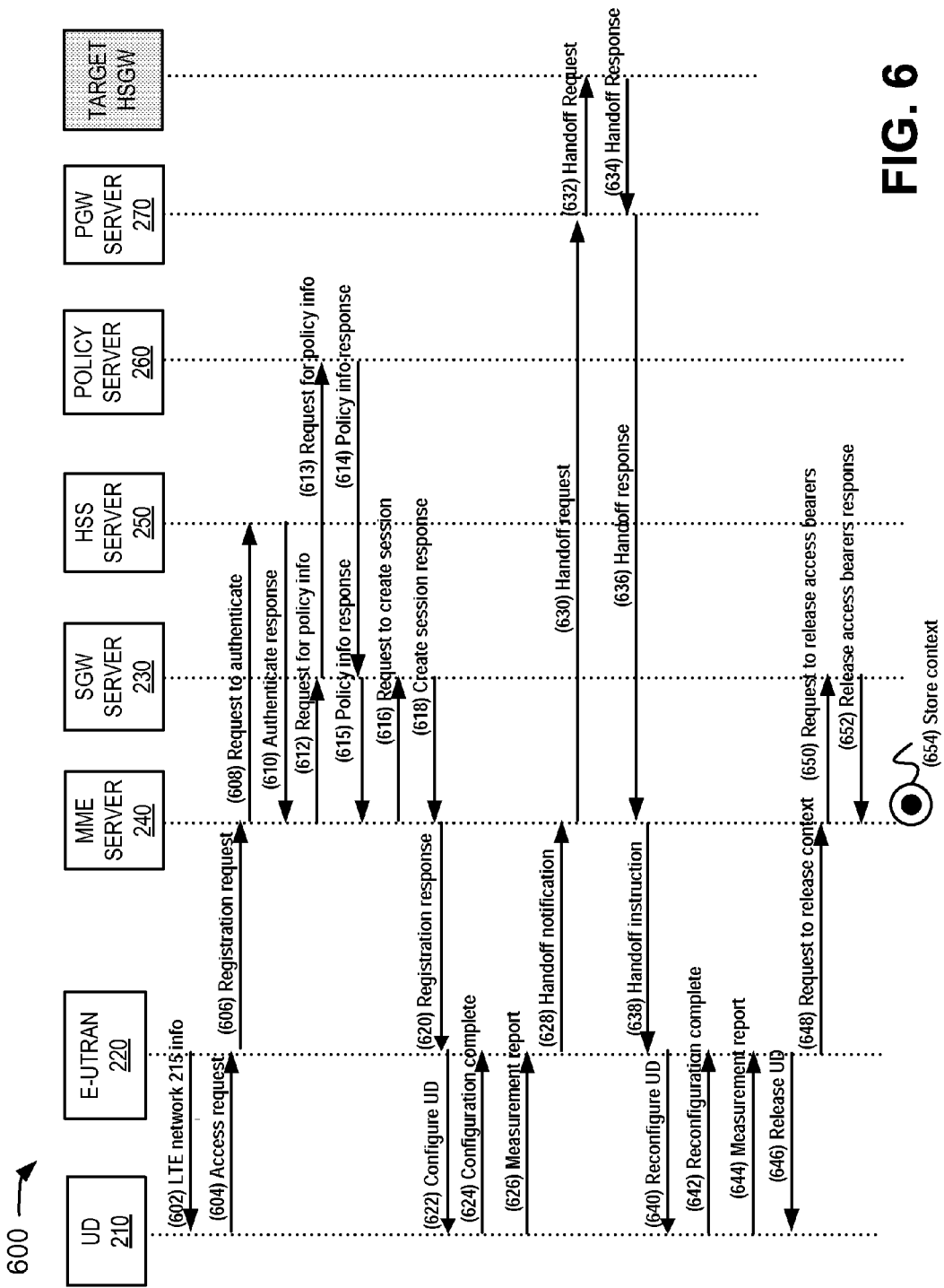
FIG. 6 is a flow diagram of an example low latency handoff associated with a long term evolution network capable of being performed by a portion of the network of FIG. 2.

FIGS. 5A and 5B are flowcharts of an example process for handing off a user device, associated with an LTE network, within an example portion of the network 200 (FIG. 2). In one implementation, process 500 may be performed by MME server 240. In another implementation, some or all of process 500 may be performed by a device or collection of devices separate from, or in combination with, MME server 240. FIG. 6 is flow diagram 600 of an example low latency handoff associated with an LTE network capable of being performed by an example portion of network 200 (FIG. 2). A portion of process 500, of FIGS. 5A and 5B, will be discussed below with corresponding references to flow diagram 600 shown in FIG. 6.

Process 500, of FIG. 5, may include receiving a registration request (block 510). Assume that user device 210 has powered up in and/or has entered into a cell associated with an LTE network (e.g., LTE network 215). Assume further that user device 210 is traveling through the cell and, at a future point in time, will leave the cell associated with LTE network 215 and be handed off to another cell, associated with another network (e.g., network 280), such as an eHRPD network that conforms to one or more of the releases associated with the LTE communication standard. It should be understood that the other network is described herein as an eHRPD network for explanatory purposes. In another implementation, the other network may be a 2G, 3G, LTE, and/or other wireless network. For example, E-UTRAN 220 (e.g. an eNodeB or set of eNodeBs corresponding to E-UTRAN 220) may transmit a signal, as indication 602 (FIG. 6), that includes information associated with a cell corresponding to LTE network 215, such as a cell identifier, uplink/downlink frequency information, a time associated with LTE network 215, and/or other network information. User device 210 may receive the transmitted signal and may transmit an access request, as indication 604 (FIG. 6), to E-UTRAN 220. The access request may include identifier information associated with user device 210 (e.g., MDN, IMSI, MSISDN, some combination thereof, etc.).

E-UTRAN 220 may receive the access request, may generate a registration request that includes the identifier information, and/or may send the registration request, as indication 606 (FIG. 6), to MME server 240. MME server 240 may receive the registration request and the handoff application may, for example, determine whether context information, associated with user device 210, is available or is stored in a memory (e.g., a memory associated with MME server 240) by comparing the identifier information, obtained from the received registration request, with other identifier information stored in the context memory, such as context memory 400 (FIG. 4).

In another implementation, E-UTRAN 220 may, in a manner similar to that described above, use the identifier information obtained from the access request, to determine whether context information is stored in a memory (e.g., context memory 400 of FIG. 4) associated with E-UTRAN 220.

If context information is not stored (block 515—NO), then a registration operation may be performed and a communication session may be established (block 520). For example, the handoff application may determine that none of the stored identifier information matches the identifier received in the registration request and may generate an authentication request that includes the identifier information.

An authentication operation may be performed. For example, the handoff application may send, as indication 608 (FIG. 6), the authentication request to HSS server 250 and HSS server 250 may receive the authentication request. HSS server 250 may compare the identifier information, obtained from the received authentication request, to identifier information stored in a memory associated with HSS server 250. If HSS server 250 determines that the received identifier information does not match the stored identifier information, then HSS server 250 may send, to MME server 240, an authentication response, as indication 610 (FIG. 6), indicating that user device 210 cannot be authenticated. MME server 240 may receive the authentication response and may send an indication (e.g., not shown in FIG. 6) to E-UTRAN 220, denying access to user device 210. If, however, HSS server 250 determines that the received identifier information matches the stored identifier information, then HSS server 250 may retrieve subscriber information associated with user device 210. The subscriber information may include particular APNs and/or corresponding PDNs associated with applications, services, networks, and/or data that is/are available to user device 210. HSS server 250 may send, to MME server 240, an authentication response, as indication 610 (FIG. 6), indicating that user device 210 has been authenticated and that includes the retrieved subscriber information.

Policy information may be retrieved. For example, MME server 240 may receive the authentication response and the handoff application may assign a TMSI to user device 210 to be used (e.g., in addition to or instead of the IMSI, MSISDN, MSID, etc.) during the communication session. Additionally, or alternatively, the handoff application may send a request for policy information to policy server 260, via SGW server 230 (as indications 612 and 613 of FIG. 6), that includes the user identifier information (e.g., that includes at least the TMSI) and/or subscriber information associated with user device 210. Policy server 260 may receive the request, may retrieve policy information from a memory associated with policy server 260, and/or may send the retrieved policy information to MME server 240, via SGW server 230 (as indications 614 and 615 of FIG. 6), in response to the request. The policy information may include security policies, signal flows, access bearer information (e.g., via which signal flows are to be implemented), quality of service thresholds, bandwidth allocations for each APN/PDN, and/or other policy information.

A communication session may be established. For example, MME server 240 may receive the policy information and the handoff application may send a request to create a session, as indication 616 (FIG. 6), to SGW server 230 that includes the user identifier information, subscriber information, and/or policy information associated with user device 210. SGW server 230 may receive the request and may establish communication channels (e.g., tunnels), via the access bearers (e.g., particular eNodeB(s), E-UTRAN 220, a particular SGW server 230, PGW server 270, etc.), that implement the signal flow policy, and/or other policy information for a communication session with user device 210. Additionally, or alternatively, SGW server 230 may communicate with PGW server 270, regarding the communication session, to obtain an IP address or set of IP addresses corresponding to each APN/PDN identified in the subscriber information. SGW server 230 may send, as indication 618 (FIG. 6), a create session response to MME server 240 that includes session information, such as the access bearers associated with the communications channels for each APN/PDN, the obtained IP address or set of IP addresses, and/or other session information.

Context information may be stored in a context memory. For example, MME server 240 may receive the session information and the handoff application may store, as context information, all or a portion of the identifier information, the subscriber information, the policy information, and/or the session information, associated with user device 210, in a context memory (e.g., context memory 400 of FIG. 4). Additionally, or alternatively, the handoff application may send a registration response, as indication 620 (FIG. 6), that includes the context information to be used during the communication session.

E-UTRAN may receive the registration response and may send configuration information to user device 210, as indication 622 (FIG. 6). For example, the configuration information may include a particular access bearer or collection of access bearers (e.g., eNodeB(s), E-UTRAN 220, SGW server 230, PGW server 270 etc.) via which to communicate during the communication session. In another example, the configuration information may further include parameters to be used, by user device 210, to determine whether signal power, received from E-UTRAN 220, is less than or equal to a particular threshold obtained from the configuration information. User device 210 may receive the configuration information, may use the configuration information to configure user device 210 to perform measurements associated with the received parameters, and/or may transmit, as indication 624 (FIG. 6), a notification that the configuration is complete.

Process 600 may include receiving a handoff notification (block 525). For example, user device 210 may perform a measurement, or a series of measurements, as user device 210 travels through a cell associated with LTE network 215. As user device 210 approaches the edge of the cell, for example, the signal received from E-UTRAN 220 may become progressively weaker. User device 210 may perform a measurement on the received signal and may compare the measured power level (e.g. and/or other parameters), associated with the received signal, with a particular threshold obtained from the configuration information included in indication 622. User device 210 may determine that the measured power level (e.g., and/or other parameters) are less than or equal to the particular threshold and, as a result, may send, as indication 626 (FIG. 6), a measurement report to E-UTRAN 220. In another example, the measurement report may include information associated with signals received and/or measured from cells associated with other networks (e.g., network 280), such as an eHRPD network, that are adjacent to LTE network 215.

Process 600 may also include determining to which network user device 210 is to be handed off and a handoff instruction may be sent (block 530). For example, E-UTRAN 220 may receive the measurement report and may send, as indication 628 (FIG. 6), a handoff notification to MME server 240. In one implementation, E-UTRAN 220 may determine to which other network user device 210 is to be handed off (e.g., a target network) and the handoff notification may identify the target network based on the received measurement report (e.g., based on information obtained from measurements associated with adjacent cells). In another implementation, MME server 240 may determine the target network based on information obtained from the measurement reports and/or other information received from E-UTRAN 220. In yet another implementation, user device 210 may be configured to determine the target network based on information obtained from the measurement report. The handoff application may generate a handoff request for a target HSGW, associated with an eHRPD network (e.g., network 280), and/or may send the handoff request to the target HSGW, via PGW server 270 as indications 630 and 632 (FIG. 6). MME server 240 may receive a response granting the handoff request, as indications 634 and 636 (FIG. 6), and/or may send a handoff instruction, to E-UTRAN 220, as indication 638 (FIG. 6), based on the response granting the handoff request. Additionally, or alternatively, MME server 240 may send an instruction to SGW server 230 (e.g., not shown in FIG. 6) to forward downlink packets destined for user device 210 to the target HSGW associated with the eHRPD network.

E-UTRAN may receive the handoff instruction and may send, as indication 640 (FIG. 6), reconfiguration information associated with the eHRPD target network (e.g., network 280), to user device 210. The reconfiguration information may include parameters to be measured by user device 210 to determine whether signal power, received from the adjacent cell corresponding to the eHRPD network, is greater than a particular threshold obtained from the reconfiguration information. User device 210 may receive the reconfiguration information, may use the reconfiguration information to reconfigure user device 210 to perform measurements associated with the received parameters, and/or may transmit, as indication 642 (FIG. 6), a notification that the reconfiguration is complete.

Process 600 may include receiving a request to release context information and context information may be stored (block 535). For example, user device 210 may perform a measurement or a series of measurements as user device 210 leaves the cell associated with LTE network 215 and/or enters another cell associated with the eHRPD network (e.g., network 280). More particularly, user device 210 may perform a measurement on a signal received from the eHRPD network and may compare the measured power level (e.g. and/or other parameters), associated with the received signal, with a particular threshold obtained from the reconfiguration information included in indication 640. User device 210 may determine that the measured power level (e.g., and/or other parameters) are greater than the particular threshold and, as a result of the measurement, may send a measurement report to E-UTRAN 220, as indication 644 (FIG. 6). E-UTRAN 220 may receive the measurement report and may send, as indication 646 (FIG. 6), a release message instructing user device 210 to begin communicating with the eHRPD network. As a result of the handoff operation, E-UTRAN 220 may send, as indication 648 (FIG. 6), a request to release context information associated with the handed off user device 210.

MME server 240 may receive the request to release context information and may send, as indication 650 (FIG. 6), a request to SGW server 230 to release access bearers associated with establishing the communication channels (e.g., tunnels) by which the communication session was established. SGW server 230 may end the communication session associated with user device 210 by releasing the access bearers and may send, as indication 652 (FIG. 6), an indication that the access bearers have been released. MME server 240 may receive the indication and the handoff application may temporarily store the context information, associated with user device 210, in a memory associated with MME server 240, as indication 654 (FIG. 6).

In one implementation, the handoff application may store the context information for a period of time (e.g., a retention time, $T_{LTE}$). For example, the handoff application may store context information, associated with user device 210, from a point in time that the request to release the context data is received to a later point in time defined by $T_{LTE}$ (e.g., 5 minutes, 15 minutes, 30 minutes, etc.). Additionally, or alternatively, the handoff application may erase the stored context information from the memory if the handoff application determines that a particular period of time that the context information was stored in the memory is greater than $T_{LTE}$. In another implementation, the handoff application may archive the context information for a particular archival time (e.g., $T_{ARCH}$). For example, the handoff application may archive context information in the memory, and/or another memory, when the handoff application determines that the particular period of time that the context data is stored is greater than $T_{LTE}$. More particularly, the handoff application may archive the context data from a point in time that the retention period expires to a later point in time defined by $T_{ARCH}$ (e.g., 30 minutes, 60 minutes, 90 minutes, etc.). Additionally, or alternatively, the handoff application may erase the archived context information if the handoff application determines that a particular period of time in which the context information was archived is greater than $T_{ARCH}$.

In yet another implementation, context retention time may be set based a particular QoS subscribed to by a user of user device 210. For example, a user of user device 210 may be offered a particular QoS package for which the user may pay a premium. In this example, the user may pay an additional cost to receive particular guarantees associated with QoS thresholds associated with dropped calls, speed of service, connectivity, etc. and the context retention time may be extended depending on which quality of service package is purchased by the user. In this example, a user subscribing to a premium QoS package may receive a longer retention period as compared to another user subscribing to a standard QoS package.

In still another implementation, the handoff application may store the context data in a memory for no set period of time. For example, the handoff application may store the context information, associated with user device 210, in the memory on a first-in-first-out (FIFO) basis. In this example, the handoff application may store the context information in the memory and may continue to store context information, associated with other user devices 210, until the memory reaches capacity and/or exceeds a threshold. At the point that the memory reaches capacity, and/or exceeds the threshold, the handoff application may begin to overwrite context information in the order in which the context information was stored in the memory on the FIFO basis or some other basis.

If context information is stored (block 515—YES) (FIG. 5A), then the context information may be retrieved and an abbreviated registration operation may be performed (block 550 of FIG. 5B). Assume that user device 210 is leaving the other cell associated with eHRPD network (e.g., network 280) and is approaching and/or entering the cell associated with LTE network 215. Assume further that MME server 240 receives a registration request associated with user device 210 (e.g., as a result of an access request sent from user device 210) from E-UTRAN 220. For example, the handoff application may determine that context information for user device 210 has been stored from a previous communication session when identifier information, obtained from the received registration request (e.g., IMSI, MSISDN, TMSI, some combination thereof, etc.), matches identifier information stored by the handoff application when the previous communication session ended (e.g., when user device 210 was handed off to another network). The handoff application may retrieve context information, associated with user device 210, from the memory based on the determination that the obtained identifier information matches the stored identifier information.

In another implementation, E-UTRAN 220 may, in a manner similar to that described above, use the identifier information obtained from the access request, to determine whether context information is stored in a memory associated with E-UTRAN 220.

Process 600 may include retrieving updated policy information and reestablishing a communication session (block 555). For example, in a manner similar to that described above with respect to block 520, the handoff application may send a request for updated policy information, to policy server 260, that includes identifier information and/or subscriber information obtained from the retrieved context information. Policy server 260 may receive the request, may retrieve updated policy information from a memory associated with policy server 260, and/or may send the updated policy information to MME server 240 in response to the request. The updated policy information may include updated security policies, updated signal flows (e.g., access bearers via which user device 210 is to communicate for each APN (and/or corresponding PDN), such as a particular eNodeB, an E-UTRAN 220, a particular SGW server 230, a particular PGW server 270, etc.), updated quality of service thresholds, other bandwidth allocations for each APN and/or corresponding PDN identified in the subscriber information, and/or other policy information.

A communication session may be reestablished. For example, MME server 240 may receive the updated policy information and the handoff application may send, to SGW server 230, a request to reestablish a communication session with user device 210 that includes the user identifier information, subscriber information, and/or the updated policy information associated with user device 210. SGW server 230 may receive the request and may reestablish communication channels (e.g., tunnels) via the access bearers that implement the updated signal flow policy for a communication session with user device 210. SGW server 230 may send a create session response to MME server 240 that includes session information, such as the access bearers associated with communications channels for each APN/PDN, the obtained IP address and/or other session information.

Process 600 may further include storing updated context information and sending updated context information (block 560). For example, MME server 240 may receive the create session response and/or may store, in a context memory (e.g., context memory 400 of FIG. 4), all or a portion of the updated policy information and/or session information associated with the reestablished communication session with user device 210. Additionally, or alternatively, MME server 240 may send a response to the registration request that includes the updated context information to be used during the reestablished communication session.

In one implementation, the handover application may have retrieved the context information from the context memory, to perform an abbreviated registration operation and/or to be used during the reestablished communication session, and may store the updated context information in the context memory. In another implementation, the handover application may have retrieved the context information from another context memory (e.g., a memory in which the context information was archived), to perform the abbreviated registration session and/or to be used during the reestablished communication session, and may store the updated context information in the context memory.

E-UTRAN 220 may receive the registration response and may send reconfiguration information to user device 210. For example, the configuration information may include a particular access bearer or collection of access bearers (e.g., eNodeB(s), E-UTRAN 220, SGW server 230, PGW server 270, etc.) via which to communicate during the reestablished communication session. In another example, the configuration information may further include parameters to be used, by user device 210, to determine whether signal power, received from E-UTRAN 220, is less than or equal to a particular threshold obtained from the reconfiguration information. User device 210 may receive the reconfiguration information, may use the reconfiguration information to reconfigure user device 210 to perform measurements associated with the received parameters, and/or may transmit a notification that the reconfiguration is complete. The handoff application may continue to manage the communication session with user device 210 and may perform a handoff operation, in a manner similar to that described above (with respect to blocks 525-535), when a handoff notification is received.

Implementations described herein may provide for low latency handoff to and/or from an LTE network. A user device may enter a cell associated with an LTE network and a request for access to the LTE network may be received. A handoff application may use user device identifier information, obtained from the request, to determine whether context information, associated with the user device, has been stored in a memory. If the handoff application determines that context information, associated with the user device is not stored in the memory, then the handoff application may perform a registration operation. The registration operation may include communicating with an HSS server to authenticate the user device and/or to retrieve subscriber information associated with the user device. The registration operation may further include obtaining policy information, associated with the LTE network, based on the subscriber information. The registration operation may yet further include communicating with a SGW server to establish a communication channel (e.g., a tunnel), via particular access bearers, to be used to establish a communication session with the user device.

The handoff application may handoff the user device to another network when the user device leaves the cell associated with the LTE network. The handoff application may store, as context data, the identifier information, the retrieved subscriber information, the obtained policy information, and/or information associated with the communication session in a memory as a result of the handoff.

If the user device reenters the cell associated with the LTE network while the memory still stores the context information, then the handoff application may retrieve the stored context information and may perform an abbreviated registration operation on the user device to reestablish the communication session. If, however, the user device reenters the cell associated with the LTE network when the memory no longer stores the context information, then the handoff application may have erased the stored context information and/or may perform a registration operation on the user device.

The foregoing description provides illustration and description, but is not intended to be exhaustive or to limit the invention to the precise form disclosed. Modifications and variations are possible in light of the above teachings or may be acquired from practice of the invention.

While a series of blocks have been described with regard to FIGS. 5A and 5B, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server device in a long term evolution (LTE) network, the method comprising:
storing, in a memory associated with the server device, context information, associated with a prior communication session between the LTE network and a user device, the context information to be stored for a set retention time that is based on a first quality of service (QoS) subscription corresponding to the user device, the set retention time being longer than another retention time associated with another QoS subscription;
receiving, by the server device, a registration request associated with the user device;

determining, by the server device and in response to the registration request, whether the context information is retained in the memory;

performing, by the server device and within the set retention time, an abbreviated registration operation to establish the communication session with the user device, using the context information retained in the memory;

erasing, from the memory, the context information after the set retention time; and performing, by the server device and outside of the set retention time, an unabbreviated registration operation to establish the communication session when the context information is not retained in the memory.

2. The method of claim 1, wherein the registration request includes identifier information associated with the user device; and wherein performing the abbreviated registration operation includes:

sending the identifier information to another server device that performs authentication operations; and receiving, from the other server device, an indication that the user device has been authenticated.

3. The method of claim 1, wherein performing the unabbreviated registration operation includes:

communicating with a first server device to obtain subscriber information associated with the user device, the subscriber information including information regarding one or more access point names (APNs) or information regarding one or more packet data networks (PDNs) corresponding to the one or more APNs;

communicating with another server device to obtain policy information associated with the LTE network, the policy information including a bandwidth allocation for the one or more APNs or security policies associated with the LTE network; and storing, in the memory as other context information, the identifier information, the subscriber information, or the policy information.

4. The method of claim 1, where a plurality of context information is stored in the memory on a first-in-first-out basis (FIFO), the method further comprising:

determining that the memory has reached capacity when a plurality of entries, associated with the memory, are filled with one or more of the plurality of context information; and overwriting the context information that is stored in one or more entries, of the plurality of entries, where overwriting the context information includes storing other context information in the one or more memory entries.

5. The method of claim 1, wherein determining whether the context information is retained in the memory further includes:

retrieving, from the memory, the context information when the context information has been stored for a period of time that exceeds a particular threshold; and archiving the context information in another memory for another period of time, the other period of time being greater than the period of time.

6. The method of claim 5, further comprising:

retrieving, from the other memory, the archived context information;

performing another abbreviated registration operation using the archived context information; and storing the archived context information in the memory.

7. The method of claim 1, wherein determining whether the context information is retained in the memory further includes:

comparing identifier information, associated with the user device and obtained from the registration request, with other identifier information, associated with the user device, stored in the memory; and determining that the context information is not retained in the memory when the identifier information, obtained from the registration request, does not match the other identifier information stored in the memory.

8. The method of claim 1, wherein determining whether the context information is retained in the memory further includes:

determining that a capacity of the memory exceeds a threshold; and erasing the context information from the memory when the capacity of the memory exceeds the threshold.

9. A server device in a long term evolution (LTE) network comprising:

a memory to store, for a first set retention time that is based on a first quality of service (QoS) subscription corresponding to a user device and that differs from one or more other retention times associated with one or more other QoS subscriptions not corresponding to the user device, first context information associated with a prior communication session between the LTE network and the user device, the first context information permitting a communication session to be established using an abbreviated registration operation, wherein the first set retention time of the first context information is longer than one or more other retention times associated with the one or more other QoS subscriptions; and a processor to:

determine whether to erase the first context information from the memory based on the first set retention time and a period of time that has elapsed since storing of the first context information in the memory, receive a request to establish a communication session with the user device, determine, in response to the request, whether the first context information has been erased from the memory, and when the first context information has not been erased from the memory:

perform the abbreviated registration operation to establish the communication session with the user device, using the first context information retrieved from the memory, and when the first context information has been erased from the memory:

perform a registration operation to establish the communication session with the user device, using other context information retrieved from one or more other server devices.

10. The server device of claim 9, where a latency time, associated with performing the abbreviated registration operation, is less than or equal to another latency time associated with performing the registration operation.

11. The server device of claim 9, where, when performing the registration operation to establish the communication session with the user device, the processor is to:

compare identifier information, associated with the user device and obtained from the request, with other identifier information associated with the user device stored in the memory, and authenticate the user device when the obtained identifier information matches the stored identifier information.

12. The server device of claim 11, wherein, when performing the unabbreviated registration operation, the processor is to:
- communicate with a home subscriber server to obtain subscriber information associated with the user device, the subscriber information including information regarding at least one access point name (APN),
- communicate with a policy server to obtain policy information associated with the LTE network, the policy information including a bandwidth allocation for the at least one APN or signal flow policies associated with the communication session, and
- store, in the memory and as the other context information, the obtained identifier information, the obtained subscriber information, or the obtained policy information.

13. The server device of claim 9, wherein the processor is further configured to:
- erase, from the memory, the first context information based on a determination that the period of time that the first context information has been stored in the memory is greater than the first set retention time.

14. The server device of claim 9, wherein the processor is further configured to:
- archive the first context information for an archive period of time based on a determination that the period of time that the first context information has been stored in the memory is greater than the first set retention time, the archive period of time being greater than the first set retention time.

15. The server device of claim 14, where the processor is further to:
- perform the registration operation, using the other context information, based on a determination that the period of time is greater than the archive period of time.

16. The server device of claim 9, where the processor is further to:
- perform a handoff operation on the user device, the handoff operation including configuring the user device to communicate with another network and releasing the user device from the communication session.

17. A system comprising:
- a memory to store a plurality of context information for a plurality of retentions times that are set based on a plurality of quality of service (QoS) subscriptions for a plurality of user devices, wherein first context information, of the plurality of context information, for a particular user device, of the plurality of user devices, permits a communication session, with a long term evolution (LTE) network, to be reestablished via an abbreviated registration operation;
- a server device, associated with the LTE network and connected to the particular user device, via the communication session, to:
  - receive a request to handoff the particular user device to another network,
  - perform, in response to the request, a handoff operation that releases the particular user device from the communication session and stores, in the memory the first context information for the particular user device for a first set retention time, of the plurality of retention times, based on a first QoS subscription corresponding to the particular user device, wherein the first set retention time is longer than another retention time associated with another QoS subscription,
  - receive, after storing the first context information in the memory, a registration request associated with the particular user device, the registration request including an identifier associated with the particular user device,
  - determine, in response to the registration request, whether memory has retained the first context information based on the received identifier information and other identifier information, associated with the particular user device, stored in the memory,
  - retrieve, from the memory, the first context information based on a determination that the received identifier information matches the stored identifier information,
  - perform the abbreviated registration operation to reestablish the communication session with the particular user device using the retrieved context information, and
  - erase, from the memory, the first context information after the first set retention time.

18. The system of claim 17, wherein, when determining whether the memory has retained the first context information, the server device is further configured to:
- perform a registration operation to establish another communication session with the particular user device, based on a determination that the received identifier information does not match the stored identifier information, the registration operation being based on other context information that is separate from the first context information.

19. The system of claim 18, where, when performing the registration operation, the server device is further to:
- communicate with a first server device to obtain policy information associated with the LTE network, the policy information including a bandwidth allocation for one or more access point names permitted for the particular user device or signal flow policies associated with the other communication session, and
- communicate with a second server device to establish, using the obtained policy information, communication channels that enable the other communication session to be established.

20. The system of claim 19, where a period of time to perform the abbreviated registration operation, is less than or equal to another period of time to perform the registration operation.

21. The system of claim 17, wherein the server device is further configured to:
- receive a request to store the first context information for the particular user device,
- determine that the memory that stores the plurality of context information has reached capacity when a plurality of entries, associated with the memory, are filled with one or more of the plurality of context information, and
- overwrite one or more entries, of the plurality of entries, that store other context information, where overwriting the one or more entries includes storing the first context information, for the particular user device, in the one or more entries.

22. The system of claim 17, wherein the server device is further configured to:
- archive, in another memory, the first context information for the particular user device.

23. The system of claim 17, where the server device is a mobility management entity (MME) server.

* * * * *